(12) United States Patent
Ou

(10) Patent No.: US 9,570,928 B2
(45) Date of Patent: Feb. 14, 2017

(54) POWER SUPPLY SYSTEM FOR WIRELESS KEYBOARD

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Guang-Feng Ou, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 259 days.

(21) Appl. No.: 14/547,302

(22) Filed: Nov. 19, 2014

(65) Prior Publication Data

US 2016/0111906 A1 Apr. 21, 2016

(30) Foreign Application Priority Data

Oct. 17, 2014 (CN) .......................... 2014 1 0551480

(51) Int. Cl.
*H02J 7/00* (2006.01)
*G06F 1/26* (2006.01)
*G06F 3/023* (2006.01)

(52) U.S. Cl.
CPC .............. *H02J 7/0054* (2013.01); *G06F 1/26* (2013.01); *G06F 3/0231* (2013.01); *H02J 7/007* (2013.01); *H02J 7/0029* (2013.01); *H02J 7/0068* (2013.01); *H02J 7/0047* (2013.01); *H02J 7/0065* (2013.01); *H02J 2007/0062* (2013.01)

(58) Field of Classification Search
CPC ..................................................... H02J 7/0054
USPC ................. 320/127, 128, 133–137, 162, 163
See application file for complete search history.

(56) References Cited

U.S. PATENT DOCUMENTS

| | | | | |
|---|---|---|---|---|
| 6,882,130 B2 * | 4/2005 | Handa | ................... | H02J 7/0065 320/135 |
| 7,123,033 B1 * | 10/2006 | Wright | ............. | G01R 19/16542 320/124 |
| 7,208,916 B1 * | 4/2007 | Boatwright | ......... | H01M 10/486 320/150 |
| 8,390,249 B2 * | 3/2013 | Walley | ................ | H01M 2/0267 320/106 |
| 8,547,061 B1 * | 10/2013 | Wong | ........................ | H02J 7/04 320/112 |

* cited by examiner

*Primary Examiner* — Richard V Muralidar
(74) *Attorney, Agent, or Firm* — Zhigang Ma

(57) ABSTRACT

A power supply system includes a charge module, a control module, and a discharge module. The charge module includes a charge circuit and a cell assembly. The control module includes a wireless unit. The discharge module includes a voltage increasing circuit coupled to the cell assembly and a voltage decreasing circuit coupled to the voltage increasing circuit. The charge module is coupled to a direct current power supply to charges the cell assembly. The cell assembly outputs a discharge voltage. The voltage increasing circuit is configured to increase the discharge voltage to a reference voltage. The voltage decreasing circuit decreases the increased discharge voltage to charge the wireless unit.

19 Claims, 2 Drawing Sheets

POWER SUPPLY SYSTEM FOR WIRELESS KEYBOARD

FIELD

The subject matter herein generally relates to a power supply system for a wireless keyboard.

BACKGROUND

Wireless keyboards are generally used as an inputting device to couple to an electronic device via wireless connection. Generally, each wireless keyboard is charged by a chargeable lithium battery.

BRIEF DESCRIPTION OF THE DRAWINGS

Implementations of the present technology will now be described, by way of example only, with reference to the attached figures.

DETAILED DESCRIPTION

Figure 1:
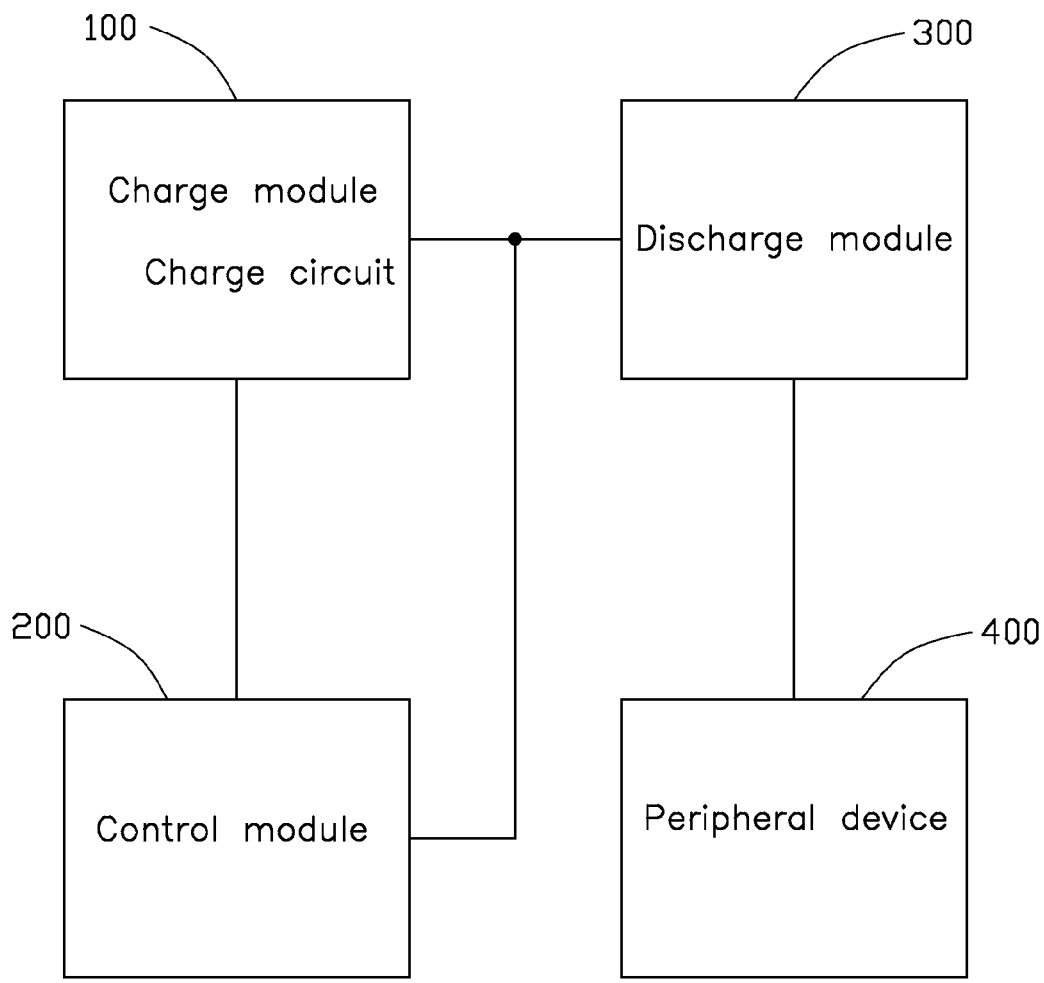
FIG. 1 is a block diagram of one embodiment of a power supply system for a wireless keyboard.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a power supply system in accordance with an embodiment. The power supply system can include a charge module 100, a control module 200, and a discharge module 300.

Figure 2:
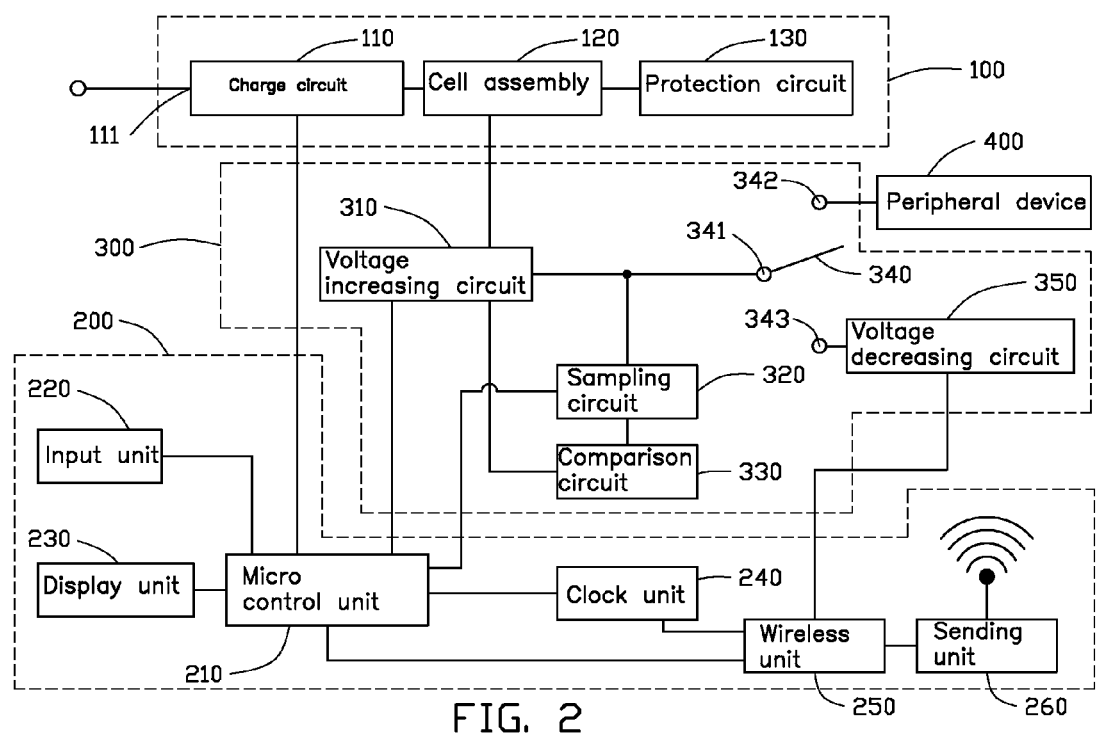
FIG. 2 is a circuit diagram of the power supply system of FIG. 1.

FIG. 2 illustrates the charge module 100 can include a charge circuit 110, a cell assembly 120, and a protection circuit 130. The charge circuit 110 has a USB port 111 configured to receive a +5V voltage from a direct current (DC) power supply. The +5V voltage charges the cell assembly 120 via the charge circuit 110. The protection circuit 130 couples to the cell assembly 120 to protect the cell assembly 120 with a voltage in a safe range. The cell assembly 120 is configured to output a discharge voltage.

The control module 200 can include a micro control unit 210, an input unit 220, a display unit 230, a clock unit 240, a wireless unit 250, and a sending unit 260. The charge circuit 110 detects the voltage of the cell assembly 120 and sends the voltage to the micro control unit 210. The micro control unit 210 sends the voltage to the display module 230 to display. The input unit 220 is configured to input data or command to the micro control unit 210. The micro control unit 210 is configured to code the data or command and send the coded data or command to the wireless unit 250. The wireless unit 250 sends the coded data or command to an electronic device, such as a computer, a TV, and a mobile phone via the sending unit 260. The clock unit 240 includes a crystal oscillator, which is configured to supply clock signals for the micro control unit 210 and the wireless unit 250.

The discharge module 300 can include a voltage increasing circuit 310, a sampling circuit 320, a comparison circuit 330, a toggle switch 340, and a voltage decreasing circuit 350. The voltage increasing circuit 310 is configured to receive the discharge voltage from the cell assembly 120 and increase the discharge voltage. The toggle switch 340 includes a first port 341, a second port 342, and a third port 343. The first port 341 is coupled to the voltage increasing circuit 310. The second port 342 is coupled to a peripheral device 400, such as a computer, a TV, and a mobile phone. The third port 343 is coupled to the wireless unit 250 via the voltage decreasing circuit 350. In at least one embodiment, the toggle switch 340 is a single-pole double-throw switch.

When the first port 341 is coupled to the second port 342, the charge module 100 charges the peripheral device 400. When the first port 341 is coupled to the third port 343, the charge module 100 charges the wireless unit 250.

In operation, the cell assembly 120 outputs the discharge voltage to the voltage increasing circuit 310. The voltage increasing circuit 310 increases the discharge voltage to a reference voltage, such as +5V. When the wireless unit 250 is needed to be charged, the toggle switch 340 is operated to couple the first port 341 to the third port 343, to couple the voltage decreasing circuit 350 to the voltage increasing circuit 310. The voltage decreasing circuit 350 decreases the increased discharge voltage to a voltage, such as 3.3V, to charge the wireless unit 250.

When the charge module 100 charges the wireless unit 250, the sampling circuit 320 detects the increased discharge voltage to the comparison circuit 330 and sends a signal to the micro control unit 210 when the detected increased discharge voltage is lower than the reference voltage, the micro control unit 210 sends a control signal to the voltage increasing circuit 310; the comparison circuit 330 compares the increased discharge voltage with the reference voltage and got a voltage difference to the voltage increasing circuit 310. The voltage increasing circuit 310 increases the increased discharge voltage to the reference voltage according to the control signal and the voltage difference.

When the wireless unit is fully charged, the toggle switch 340 can be operated to couple the first port 341 to the second port 342, so that the charge module 100 can charge the peripheral device 400.

When the discharge voltage from the cell assembly 120 is lower than a low limit voltage, such as +2.7V, the DC power supply charges the cell assembly 120. When the cell assembly 120 is charged to a high limit voltage, such as +4.2 V, the charge circuit 110 sends out a level turn signal to the micro control unit 210 to stop charging the cell assembly 120.

The embodiments shown and described above are only examples. Many details are often found in the art such as the other features of a power supply system for wireless keyboard. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A power supply system comprising:
a charge module comprising a charge circuit and a cell assembly;
a control module comprising a wireless unit; and
a discharge module comprising a voltage increasing circuit, a toggle switch, and a voltage decreasing circuit,
wherein the charge module is coupled to a direct current power supply and to the cell assembly and is configured to charge the cell assembly;
the cell assembly is configured to output a discharge voltage;
the voltage increasing circuit is configured to increase the discharge voltage to a reference voltage;
the toggle switch is operable in a first mode in which the voltage decreasing circuit and the voltage increasing circuit are switched off by the toggle switch;
the cell assembly is further configured to charge a peripheral device; and
the toggle switch is further operable to a second mode in which the voltage decreasing circuit and the voltage increasing circuit are switched on by the toggle switch, and the voltage decreasing circuit decreases the increased discharge voltage to charge the wireless unit.

2. The power supply system of claim 1, wherein the charge module further comprises a protection circuit coupled to the cell assembly, and the protection circuit is configured to protect the cell assembly having a voltage between a low limit voltage and a high limit voltage.

3. The power supply system of claim 1, wherein the control module further comprises a display unit and a micro control unit coupled to the charge circuit and the display unit, the charge circuit is further configured to detect a real time voltage of the cell assembly and sends the real time voltage to the micro control unit, and the micro control unit is configured to control the display unit to display the real time voltage.

4. The power supply system of claim 3, wherein the control module further comprises an input unit and a sending unit; the input unit is configured to input data or command to the micro control unit; the micro control unit is configured to code the data or command and send the coded data or command to the wireless unit; and the wireless unit is configured to send the coded data or command to an electronic device.

5. The power supply system of claim 3, wherein the control module further comprises a clock unit, which is configured to supply clock signals for the micro control unit and the wireless unit.

6. The power supply system of claim 1, wherein the discharge circuit further comprises a sampling circuit, the sampling circuit is configured to detect the increased discharge voltage, when the increased discharge voltage is lower than the reference voltage, the sampling circuit sends a signal to the micro control unit, and the micro control unit sends a control signal to the voltage increasing circuit.

7. The power supply system of claim 6, wherein the discharge circuit further comprises a comparison circuit coupled to the sampling circuit and the voltage decreasing circuit, and the comparison circuit is configured to compare the increased discharge voltage with the reference voltage and get a voltage different from the voltage increasing circuit.

8. The power supply system of claim 7, wherein the voltage increasing circuit is further configured to increases the increased discharge voltage to the reference voltage according to the control signal and the voltage difference.

9. The power supply system of claim 1, wherein the toggle switch comprises a first port, a second port, and a third port, the first port is coupled to the voltage increasing circuit, the second port is coupled to the peripheral device, and the third port is coupled to the voltage decreasing circuit; when the first port is coupled to the second port, the toggle switch is operated in the first mode; and when the first port is coupled to the third port, the toggle switch is operated in the second mode.

10. A power supply system comprising:
a charge module comprising a charge circuit and a cell assembly;
a control module comprising a wireless unit; and
a discharge module comprising a voltage increasing circuit coupled to the cell assembly and a voltage decreasing circuit coupled to the voltage increasing circuit;
wherein the charge module is coupled to a direct current power supply and to the cell assembly and is configured to charge the cell assembly;
the cell assembly is configured to output a discharge voltage;
the voltage increasing circuit is configured to increase the discharge voltage to a reference voltage; and
the voltage decreasing circuit is configured to decrease the increased discharge voltage to charge the wireless unit.

11. The power supply system of claim 10, wherein the discharge module further comprises a toggle switch, and the voltage increasing circuit is configured to increase the discharge voltage to a reference voltage; the toggle switch is operable to be operated in a first mode, the voltage decreasing circuit and the voltage increasing circuit is switched off by the toggle switch, and the increased discharge voltage is configured to charge a peripheral device; or a second mode, the voltage decreasing circuit and the voltage increasing circuit is switched on by the toggle switch.

12. The power supply system of claim 11, wherein the toggle switch comprises a first port, a second port, and a third port, the first port is coupled to the voltage increasing circuit, the second port is coupled to the peripheral device, and the third port is coupled to the voltage decreasing circuit; when the first port is coupled to the second port, the toggle switch is operated in the first mode; and when the first port is coupled to the third port, the toggle switch is operated in the second mode.

13. The power supply system of claim 10, wherein the charge module further comprises a protection circuit coupled to the cell assembly, and the protection circuit is configured to protect the cell assembly having a voltage between a low limit voltage and a high limit voltage.

14. The power supply system of claim 10, wherein the control module further comprises a display unit and a micro control unit coupled to the charge circuit and the display unit, the charge circuit is further configured to detect a real time voltage of the cell assembly and sends the real time voltage to the micro control unit, and the micro control unit is configured to control the display unit to display the real time voltage.

15. The power supply system of claim 14, wherein the control module further comprises an input unit and a sending unit; the input unit is configured to input data or command to the micro control unit; the micro control unit is configured to code the data or command and send the coded data or command to the wireless unit; and the wireless unit is configured to send the coded data or command to an electronic device.

16. The power supply system of claim 14, wherein the control module further comprises a clock unit, which is configured to supply clock signals for the micro control unit and the wireless unit.

17. The power supply system of claim 10, wherein the discharge circuit further comprises a sampling circuit, and the sampling circuit is configured to detect the increased discharge voltage; when the increased discharge voltage is lower than the reference voltage, the sampling circuit sends a signal to the micro control unit, and the micro control unit sends a control signal to the voltage increasing circuit.

18. The power supply system of claim 17, wherein the discharge circuit further comprises a comparison circuit coupled to the sampling circuit and the voltage decreasing circuit, and the comparison circuit is configured to compare the increased discharge voltage with the reference voltage and get a voltage different from the voltage increasing circuit.

19. The power supply system of claim 18, wherein the voltage increasing circuit is further configured to increases the increased discharge voltage to the reference voltage according to the control signal and the voltage difference.

* * * * *